United States Patent [19]
Konshak et al.

[11] Patent Number: 5,326,045
[45] Date of Patent: Jul. 5, 1994

[54] LEADER BLOCK FOR STORAGE TAPE MEDIA

[75] Inventors: Michael V. Konshak, Louisville; Justus A. W. Horstman, Boulder, both of Colo.

[73] Assignee: Storage Technology Corporation, Louisville, Colo.

[21] Appl. No.: 50,506

[22] Filed: Apr. 20, 1993

[51] Int. Cl.$^5$ .............................................. G03B 1/02
[52] U.S. Cl. ...................................... 242/358; 360/95
[58] Field of Search .................. 29/432, 806; 403/283, 403/274; 24/115 G, 115 H, 129 A, 163 K; 360/95; 242/195

[56] References Cited

U.S. PATENT DOCUMENTS

| | | | |
|---|---|---|---|
| 2,667,695 | 2/1954 | Price | 24/115 G |
| 3,124,409 | 3/1964 | Nisula | 403/283 |
| 3,329,391 | 7/1967 | Deane | 24/115 G |
| 3,405,882 | 10/1968 | Bottani | 242/195 |
| 3,594,512 | 7/1971 | Castagna | 360/95 |
| 3,608,158 | 9/1971 | Bengtsson | 24/170 |
| 4,452,406 | 6/1984 | Richard | 360/95 |
| 5,121,276 | 6/1992 | Weeks et al. | 242/195 |

FOREIGN PATENT DOCUMENTS 188130  3/1937  Switzerland ..................... 24/115 G

*Primary Examiner*—Mark Rosenbaum
*Assistant Examiner*—David P. Bryant
*Attorney, Agent, or Firm*—Sheridan Ross & McIntosh

[57] ABSTRACT

A leader block is provided for connection to a free end of storage tape media. The leader block includes a main body and a clamp member. The main body and clamp member define a space for receiving the free end of the storage tape media. A punch member is joined to the clamp member. The main body, the clamp member and the punch member are parts of a single, integral device that is preferably made by molding. After the storage tape media is inserted into the receiving space between the main body and the clamp member, the clamp member is caused to move relative to the main body by applying sufficient, predetermined shear forces. The punch member is also caused to move relative to the clamp member. The storage tape media is sandwiched between the main body and the clamp member using forces provided by the punch member and clamping forces caused by the main body and the clamp member.

5 Claims, 5 Drawing Sheets

LEADER BLOCK FOR STORAGE TAPE MEDIA

FIELD OF THE INVENTION

The present invention relates to clamping an intermediate member to a device and, in particular, to a single piece leader block for clamping storage tape media that is connected to a tape cartridge assembly.

BACKGROUND OF THE INVENTION

Tape cartridges containing wound tape commonly have a leader block connected to a free end of the tape located outside of the cartridge housing. The leader block is used in connecting the tape to another mechanism for subsequent use in writing on or reading from the tape. The leader block must be connected in some manner to the tape. Typical leader blocks include two separate pieces. In one implementation, a channel is formed in a leader block body. The free end of the tape is positioned in the channel. A pin is then wedged into the channel to hold the tape in the channel. In a second implementation, a leader block body includes a slot having a rib extending outwardly throughout the length of the slot. The free end of the tape has portions that are positioned in this slot. A male member having a slit along its length is then positioned in the slot so that the rib is inserted into the slit. The wedge fit between the male member and the slot, as well as the rib and the slit, act to secure the tape to the leader block.

Despite the variously configured leader blocks, it would be advantageous to provide a one-piece leader block that can be easily manipulated to connect the free end of the tape to the leader block. Relatedly, it would be desirable to facilitate relative movement between parts of the integral leader block in order to securely hold tape to the leader block.

SUMMARY OF THE INVENTION

In accordance with the present invention, an integral, one-piece device is disclosed for securing an intermediate member thereto, such as the free end of storage tape media. The tape media is preferably connected to a tape cartridge assembly and the tape cartridge assembly acts as a storage medium. That is, the tape cartridge assembly is a storage medium from which data can be read from and written to.

The device of the present invention includes a main body and a clamp member. The main body and the clamp member are arranged to define a receiving space. This space is intended to receive the intermediate member that is to be connected to the device. A punch member is joined to the clamp body and is movable relative thereto upon application of sufficient force. The main body, the clamp member and the punch member are preferably integrally formed by a molding process. The molded device has predetermined force relationships between the main body and the clamp member and between the clamp member and the punch member. In particular, after the free end of the tape is positioned in the receiving space defined between the main body and the clamp member, shear forces are applied to cause the clamp member to move relative to the main body in order to secure or fixedly sandwich the tape media between the main body and the clamp member. The interaction between the clamp member and the main body provides a clamping force along that length of the tape media held therebetween. Subsequently or simultaneously, the punch member is moved relative to the clamp member in a direction substantially perpendicular to the length or longitudinal extent of the tape. The punch member preferably advances through the tape media, with a portion of the punch member exiting into an enlarged open area formed in the main body. The punch member provides a further holding force in a direction substantially perpendicular to the length of the tape media to hold the tape media securely in place.

With respect to providing sufficient forces to cause the afore-described relative movements, this can be accomplished manually or automatically, such as by means of a machine that engages the necessary parts at the appropriate times and imparts the required forces for overcoming the integrally formed connections among the parts.

In addition to securing tape media, other applications of a clamping device of the present invention are feasible. For example, it may be desirable to attach an intermediate member to a clamping device in which the intermediate member, for example, is made of a different material than the clamping device. In such an embodiment, the intermediate member might be a metal sheet that is a relatively thin but rigid material. The clamping device includes pre-formed holes through each of which a pin is caused to move to hold the intermediate member. Movement of the pins occurs after the intermediate member is positioned in a receiving space formed in the clamping device.

Based on the foregoing invention summary, a number of salient features of the present invention are readily discerned. A one-piece clamping device is provided for tightly securing an intermediate member, such as tape media. The one-piece device for use with tape media is preferably molded. Predetermined forces must be overcome, after an intermediate member is positioned in the clamping device, to cause relative movement for clamping the intermediate member. In that regard, the magnitude(s) of such forces can be varied or "tuned" to meet a desired application. Storage tape media, or another intermediate member, is secured and unwanted removal is avoided by the necessity of overcoming clamping or securing forces created by both the clamping interaction between the main body and the clamp member and the punch member. The relative movements required by the parts of the clamping device can be accomplished manually or automatically by machine. The clamping device may have utility in implementations other than in connection with storage tape media. The clamping device is easy to make, readily connectable to tape media and securely holds the tape media in place.

Additional advantages of the present invention will become readily apparent from the following discussion, particularly when taken together with the accompanying drawings.

DETAILED DESCRIPTION

Figure 1:
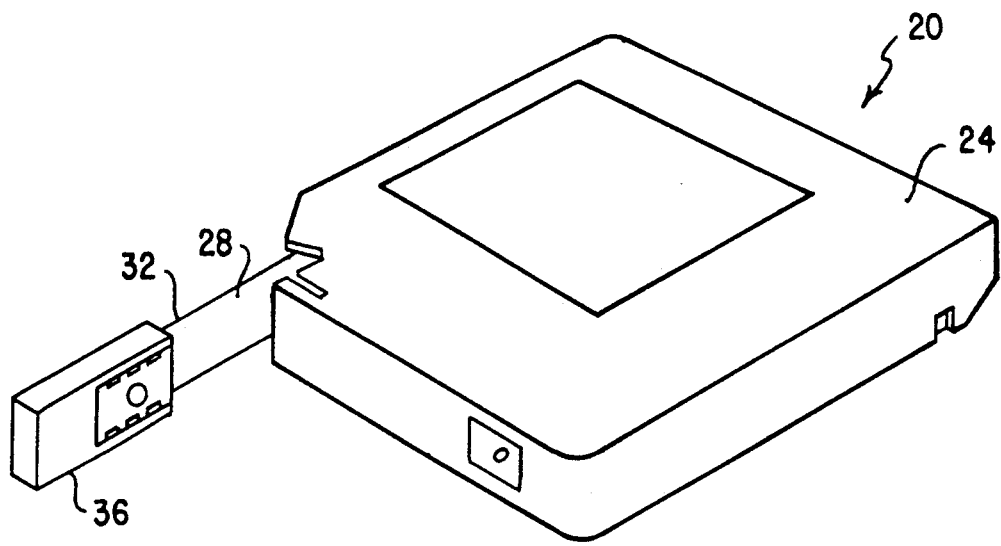
FIG. 1 is a perspective view of a tape cartridge assembly illustrating the leader block of the present invention connected thereto.

With reference to FIG. 1, a cartridge assembly 20 is illustrated and includes a cartridge housing 24 for containing storage tape media 28 that is typically found within the housing 24. The storage tape media is used to store information that has been written on the tape media. The information stored on the tape media 28 is accessible for reading the information therefrom. Any one of a number of commercially available apparatuses can be used in reading/writing digital information, for example, relative to the storage tape media 28.

The tape media 28 has a free end 32 that extends outwardly from the cartridge housing 24 and is connected to the leader block 36 of the present invention. The leader block 36 acts as a connector to an apparatus that is used in connection with the transferring of data or other information relative to the storage tape media 28.

Figure 2:
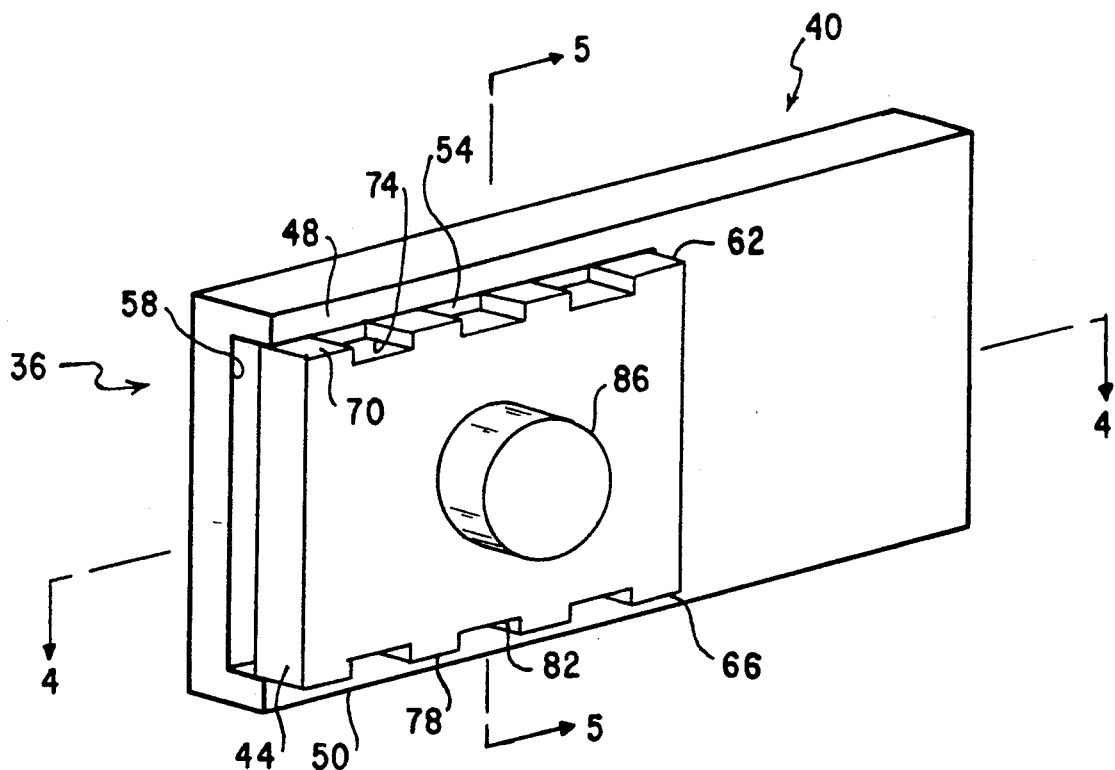
FIG. 2 is a perspective view of the leader block of the present invention before securing the tape media thereto.

Referring to FIG. 2, the leader block 36 includes a main body 40 and a clamp member 44. The main body 40 includes an end section that has a U-shaped configuration, in cross-section. This configuration has first and second walls 48, 50 that define an open area 54 or cavity formed in the main body 40. With the clamp member 44 joined to the main body 40, a receiving space 58 exists for receiving an intermediate member, such as the storage tape media 28.

The clamp member 44 includes a first or upper peripheral edge 62 and a second or lower peripheral edge 66, each of which extends along the length of the clamp member 44. Each of the two peripheral edges 62, 66 has alternating ridges and openings or slots formed therein, with the first peripheral edge 62 having alternating ridges 70 and slots 74, while the second peripheral edge 66 has alternating ridges 78 and slots 82.

The leader block 36 also includes a punch member 86 joined to an outer surface of the clamp member 44, although the punch member could be joined to the main body 40. The main body 40, clamp member 44 and punch member 86 are preferably integrally formed as a one-piece unit. The leader block 36 is preferably made by molding whereby the entire, single unit can be made during one molding process.

Figure 4:
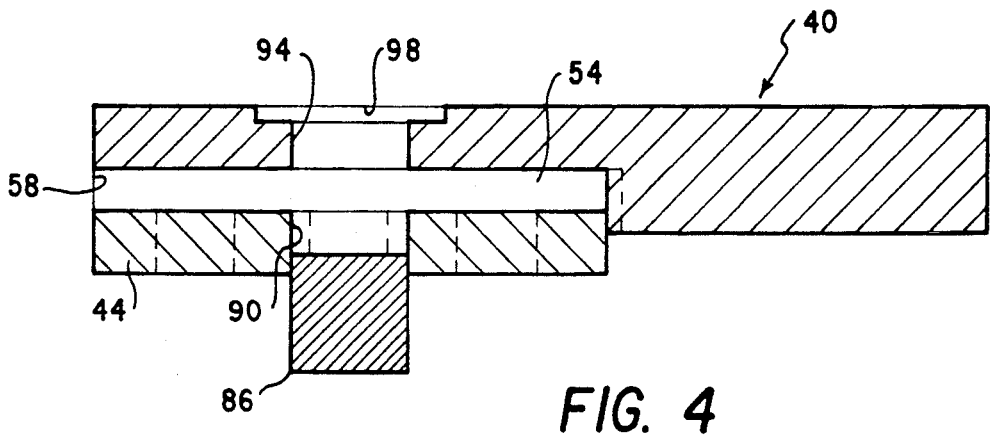
FIG. 4 is a longitudinal cross-sectional view, taken along lines 4—4 of FIG. 2, illustrating the intermediate member receiving space and the position of the punch member relative to the clamp member.
Figure 5:
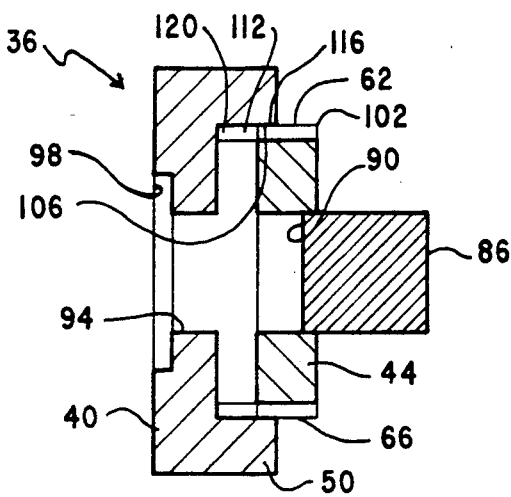
FIG. 5 is a lateral cross-sectional view, taken along lines 5—5 of FIG. 2, further illustrating the receiving space, the positioning of the punch member relative to the clamp member and the location of the clamp member relative to the main body before relative movements therebetween.

Referring now to FIGS. 4 and 5, the interconnection among the parts of the leader block 36 are better illustrated. As seen in FIG. 4, the receiving space 58 is created by the cooperation between the clamp member 44 and the main body 40, particularly the open area 54 of the main body 40. That is, with part of the clamp member 44 extending into the open area 54, an inner wall surface of the clamp member 44 and a bottom surface of the open area 54 define the receiving space 58. As also seen in FIG. 4, the punch member 86 is positioned in a bore hole 90 that extends through the clamp member 44 and communicates with a through hole 94 formed in the main body 40. The through hole 94 has an enlarged area 98 that terminates at an outer surface of the main body 40.

As illustrated in FIG. 5, the peripheral edge 62 of the clamp member 44 has front portions 102 and back portions 106. The main body 40 first wall 48 has an inner face 112 with front portions 116 and back portions 120. When the leader block 36 is integrally formed, the back portions 106 of the peripheral edge 62 are joined to the front portions 116 of the inner face 112 of the main body 40. More specifically, back portions of the ridges 70 of the first peripheral edge 62 are connected to the inner surface 112 of the first wall 48. As should be understood, the extent of the joining or connection between the peripheral edge 62 and the inner surface of the first wall 48 establishes the amount of shear force required to break or sever any such connection. The size of the connection depends upon the magnitude of the surface area attachment between the inner surface of the first wall 48 and the ridges 70. A larger area of connection generally means a greater force that must be overcome to sever the attachment between the main body 40 and the clamp member 44.

Likewise, the inner surface of the second wall 50 is joined to the second peripheral edge 66, with back portions of the second peripheral edge 66 being joined to front portions of the inner surface of the second wall 50.

Figure 6A:
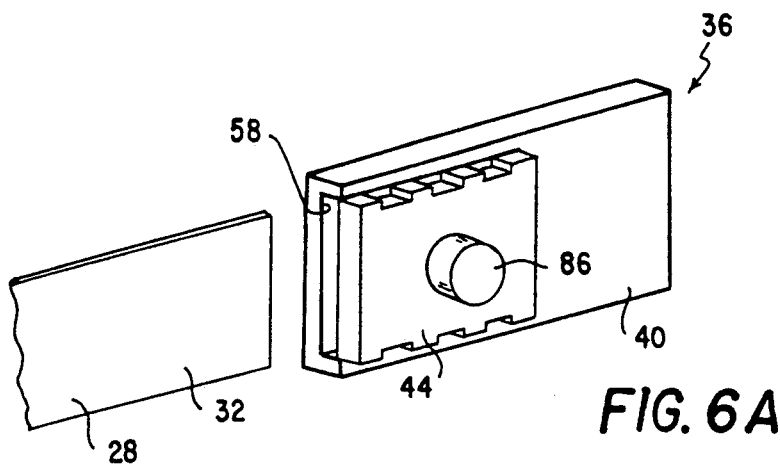
FIGS. 6A-6D illustrate the steps associated with securing tape media to the leader block including positioning of the tape media in the receiving space, relative movement between the clamp member and the main body and relative movement between the punch member and the clamp member.
Figure 6B:
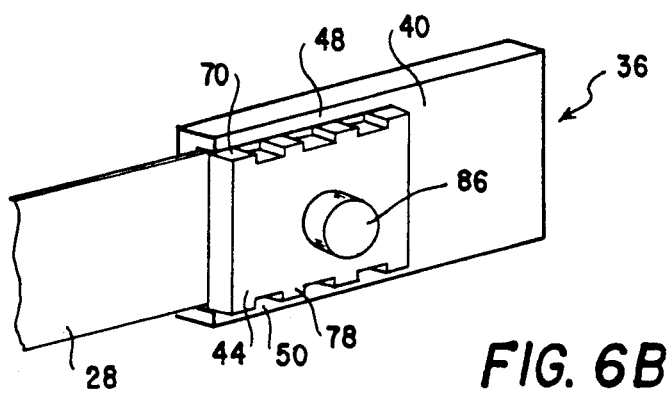
Figure 6C:
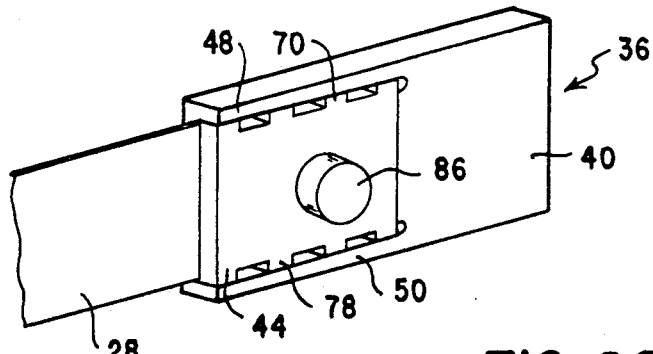
Figure 6D:
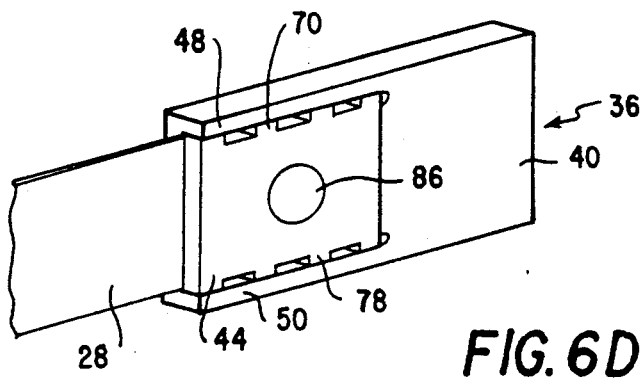

Referring now to FIGS. 6A-6D, the clamping or joining of an intermediate member, such as the storage tape media 28, to the leader block 36 is illustrated. As seen in FIG. 6A, the free end 32 of the tape media 28 is positioned to be inserted into the receiving space 58 formed in the leader block 36. The free end 32 is inserted into the receiving space 58 and is positioned between the clamp member 44 and the main body 40, as seen in FIG. 6B. At this stage, the tape media 28 is properly positioned for joining or clamping it to the leader block 36. The clamping of the tape media 28 to the leader block 36 is illustrated in FIGS. 6C-6D. As illustrated in FIG. 6C, the clamp member 44 is caused to move relative to the main body 40. In so doing, the connection between the ridges 70 and the inner surface of the first wall 48, together with that between the ridges 78 and the inner surface of the second wall 50, are broken or severed by applying sufficient shearing forces to the clamp member 44. Once sufficient shearing force is applied, the clamp member 44 is able to move relative to the first and second walls 48, 50 towards the tape media free end 32 in order to clamp or sandwich the free end 32 to the leader block 36. In connection with the step of FIG. 6C, the tape media 28 is now secured to the leader block 36 to keep the tape media free end 32 flat and taut. Removal of the free end 32 is opposed by the clamping forces provided by the cooperation between the main body 40 and the clamp member 44. As illustrated in FIG. 6D, a force is applied to the punch member 86, which is sufficient to overcome the engagement between lower end portions thereof and the inner wall of the bore hole 90. Such a force causes the punch member 86 to move towards and in contact with the tape media free end 32. Continued application of the force causes portions of the punch member 86 to punch a hole through the free end 32. Such lower portions of the punch member 86 continue to move into the through hole 94 and then the enlarged open area 98 provided in the main body 40. The punch member 86 further provides a connection that opposes any pulling force that might attempt to remove the tape media 28 from the leader block 36. The punch member 86 also firmly aligns the clamp member 44 to the main body 40.

Figure 3:
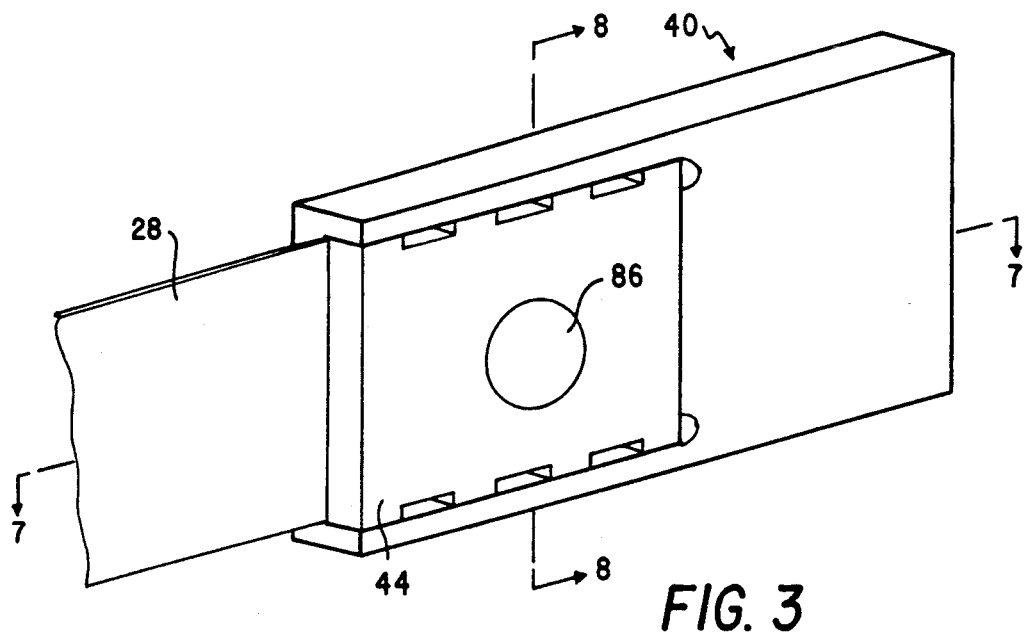
FIG. 3 is a perspective view of the leader block with the tape media secured thereto.
Figure 7:
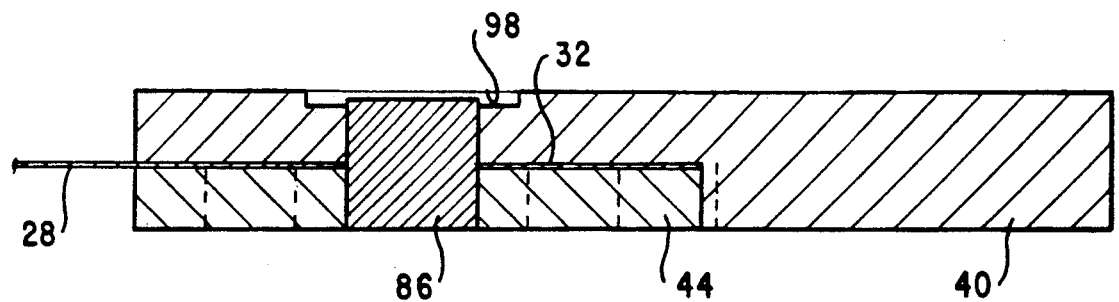
FIG. 7 is a longitudinal cross-sectional view, taken along lines 7—7 of FIG. 3, further illustrating the securement of the tape media to the leader block.
Figure 8:
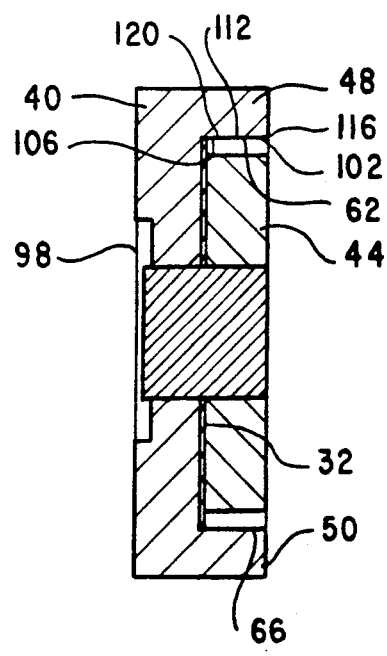
FIG. 8 is a lateral cross-sectional view, taken along lines 8—8 of FIG. 3, further illustrating the securement of the tape media to the leader block including the punch member inserted through a portion of the free end of the tape media.

With regard to illustrations showing the tape media 28 clamped to the leader block 36, reference is made to FIGS. 3, 7 and 8. As seen in FIG. 3, the tape media 28 is connected to the leader block 36, with the punch member 86 having been caused to move from its outward position to a position engaging the free end 32 of the tape media 28. As seen in FIG. 7, the storage tape media 28 is clamped or sandwiched between the main body 40 and the clamp member 44. The clamp member 44 outside surface is substantially flush with the adjacent outer surface portions of the main body 40. Likewise, the outer surface of the punch member 86 is flush with the clamp member 44 outside surface. The opposite end of the punch member 86 is received in the enlarged area 98 and this end is below the surface of the main body 40.

As seen in FIG. 8, the first peripheral edge 62 now has its back portions 106 contiguously adjacent to the back portions 120 of the inner face of the first wall 48. The front portions 102 of the first peripheral edge 62 are contiguously adjacent to the front portions 116 of the inner face 112 of the first wall 48. Similarly, front and back portions of the peripheral edge 66 on the clamp member 44 are aligned with front and back portions of the inner face of the second wall 50. In the clamping configurations of FIGS. 7 and 8, it can be seen that clamping forces are applied by inner surfaces of the main body 44 and the clamp member 40 and an additional resisting force results from the punch member 86 that was caused to move through the free end 32 of the tape media 28. These forces resist any opposing force that attempts to remove or pull the tape media 28 from the leader block 36 in a direction along the length of the tape media 28.

Figure 9:
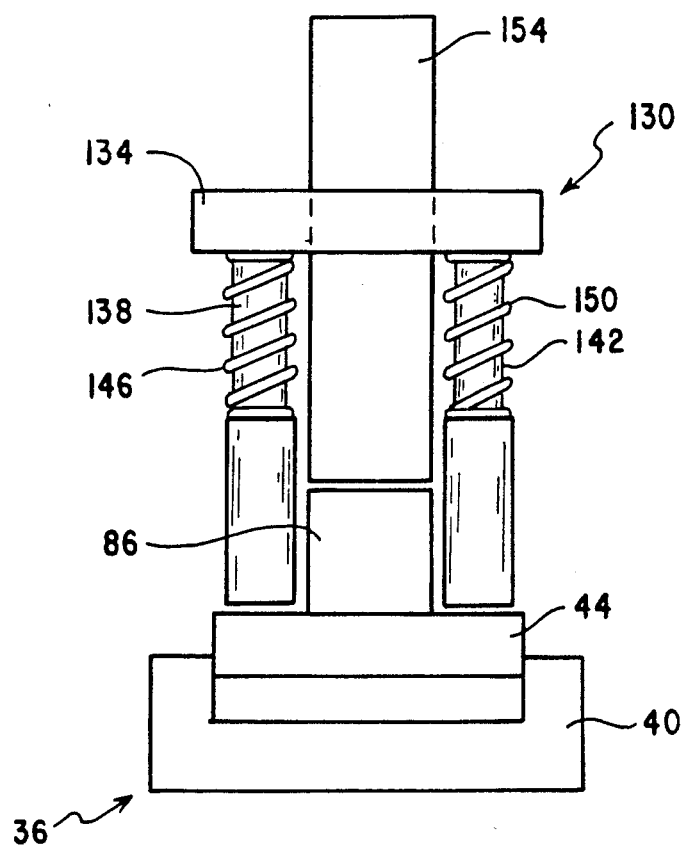
FIG. 9 is a front view schematically illustrating a machine for use in applying forces to cause relative movements between the parts of the clamping device of the present invention.

With regard to mechanisms for causing the desired relative movements of the parts of the leader block 36, such can be accomplished manually using a suitable tool or tools that engage one or more of the parts of the leader block 36. In one embodiment, clamping of the free end of the storage tape media can be accomplished automatically or virtually automatically. Referring to FIG. 9, a clamping mechanism 130 is schematically illustrated. The clamping mechanism 130 includes an actuator 134 that applies a force to a pair of rods 138, 142. The rods 138, 142 are suitably positioned relative to the clamp member 44 so that, when the rods 138, 142 are caused to move towards the clamp member 44, the rods 138, 142 impart a force that overcomes or severs the Connection between the clamp member 44 and the main body 40. The rods 138, 142 continue their movement until the clamp member 44 securely clamps or sandwiches the tape media 28 between the clamp member 44 and the main body 40. After that, the force applied to the actuator 134 is removed and the springs 146, 150 enable the rods 138, 142, respectively, to return to their initial starting position. Simultaneously or subsequently, the cylinder 154 has a force applied thereto such that it moves in the same direction as the rods 138, 142, but engages the punch member 86 and causes it to move relative to the clamp member 44 through the storage tape media 28. With regard to the cylinder 154 applying a force at the same time as the rods 138, 142, the actuator 134 is connected to the cylinder 154 so that the actuator 134 causes all of these members to move at the same time. In such a case, the clamping mechanism 130 is configured such that the cylinder 154 has caused the punch member 86 to stop at a desired position at the same time the clamp member 44 is at a desired position relative to the main body 40. When this occurs, the force applied to the actuator 134 is removed and the springs 146, 150 act to return the rods and cylinder to their starting positions.

Figure 10:
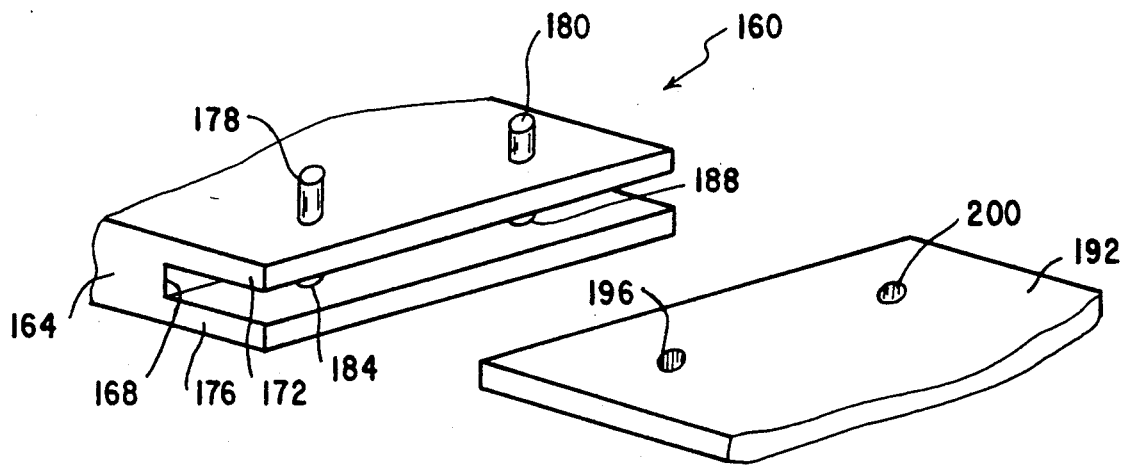
FIG. 10 is a perspective view schematically illustrating a clamping device of another embodiment.

Although the description of the invention has so far been described as being for use in connecting storage tape media to a leader block, a related embodiment can be devised for holding an intermediate member relative to a clamping device, as schematically illustrated in FIG. 10. The clamping device 160 includes a body member 164 having a channel 168 provided along one edge of the body member 164. The channel 168 is bounded by first and second legs 172, 176 that are integral with the body member 164. Joined to the upper surface of the first or upper leg 172 is one or more pins 178, 180. Formed through the second or lower leg 176 are bore holes 184, 188 that are aligned with the pins 178, 180, respectively. An intermediate member 192 is provided for receipt by the channel 168. In one embodiment, the intermediate member 192 is a piece of sheet metal having holes 196, 200 formed through the sheet metal at predetermined locations. The predetermined locations correspond to the number of pins 178, 180. To clamp the sheet metal 192 to the clamping device 160, the sheet metal is positioned in the channel 168 such that the holes 196, 200 are aligned with the pins 178, 180, respectively. Subsequently, the pins 178, 180 are caused to move through the holes 196, 200 in the intermediate member 192 and continue into the bore holes 184, 188, respectively. The insertion of the pins 178, 180 through the intermediate member 192 acts to hold or clamp the intermediate member 192 to the clamping device 160. In one applicable embodiment, the clamping device 160 is made from a material different from the material from which the intermediate member 192 is made. For example, the intermediate member 192 is a metal sheet, while the clamping device is made from plastic or some other non-metallic material. In this embodiment, the connection or clamping forces are supplied solely by using the pins 178, 180 and there is no lateral movement of parts to create a sandwiching or clamping of the intermediate member 192, as in the embodiment of FIGS. 1-9.

The foregoing discussion of the invention has been presented for purposes of illustration and description. Further, the description is not intended to limit the form disclosed therein. Consequently, variations and modifications commensurate with the above teachings, and the skill or knowledge in the relevant art, are within the present invention. The embodiments described hereinabove are intended to explain the known modes of practicing the invention and to enable others skilled in the art to utilize the invention and various embodiments and with the various modifications required by their particular applications or uses of the invention. It is intended that the appended claims be construed to include alternative embodiments to the extent permitted by the prior art.

What is claimed is:

1. A combination clamping device and intermediate member, comprising:
    a main body including a top portion, a bottom wall, and a first side wall that includes said top portion;
    a clamp member including upper side edges, lower side edges, and a bottom;
    a punch member integrally joined to one of said main body and said clamp member; and
    an intermediate member to be clamped between said main body and said clamp member;
    wherein said main body, said clamp member and said punch member are in first positions in which at least portions of said clamp member lower side edges are integrally connected to said main body top portion, an intermediate space thereby being defined by said bottom wall and said first side wall of said main body and said bottom of said clamp member, said intermediate member being received in said intermediate space, and
    wherein a shear force required to sever said integral connection between said clamp member and said main body depends upon an area of connection between said main body top portion and said portions of said clamp member lower side edges, and
    wherein said punch member and at least one of said main body and said clamp member are movable to second positions after said integral connection is severed to capture said intermediate member and, in said second positions, said intermediate member is clamped between said bottom wall of said main body and said bottom of said clamp member, said punch member is located through said intermediate member, said clamp member lower side edges are adjacent to said main body bottom wall, and said clamp member upper side edges are adjacent to said main body top portion.

2. A device, as claimed in claim 1, wherein:
    said main body comprises a substantially flat member with walls opposite side integrally joined to sides of said flat member to define a U-shape.

3. A device, as claimed in claim 1, wherein:
    said clamp member upper and lower side edges include a plurality of ridges comprising at least a first ridge and at least a first slot adjacent to said first ridge.

4. A device, as claimed in claim 1, wherein:
    said main body, said clamp member and said punch member are components of a unitary molded unit and said intermediate member is storage tape media.

5. A device, as claimed in claim 1, wherein:
    said punch member is joined to said clamp member and said clamp member is movable relative to said main body after said intermediate member is positioned therebetween.

* * * * *